Patented Oct. 16, 1934

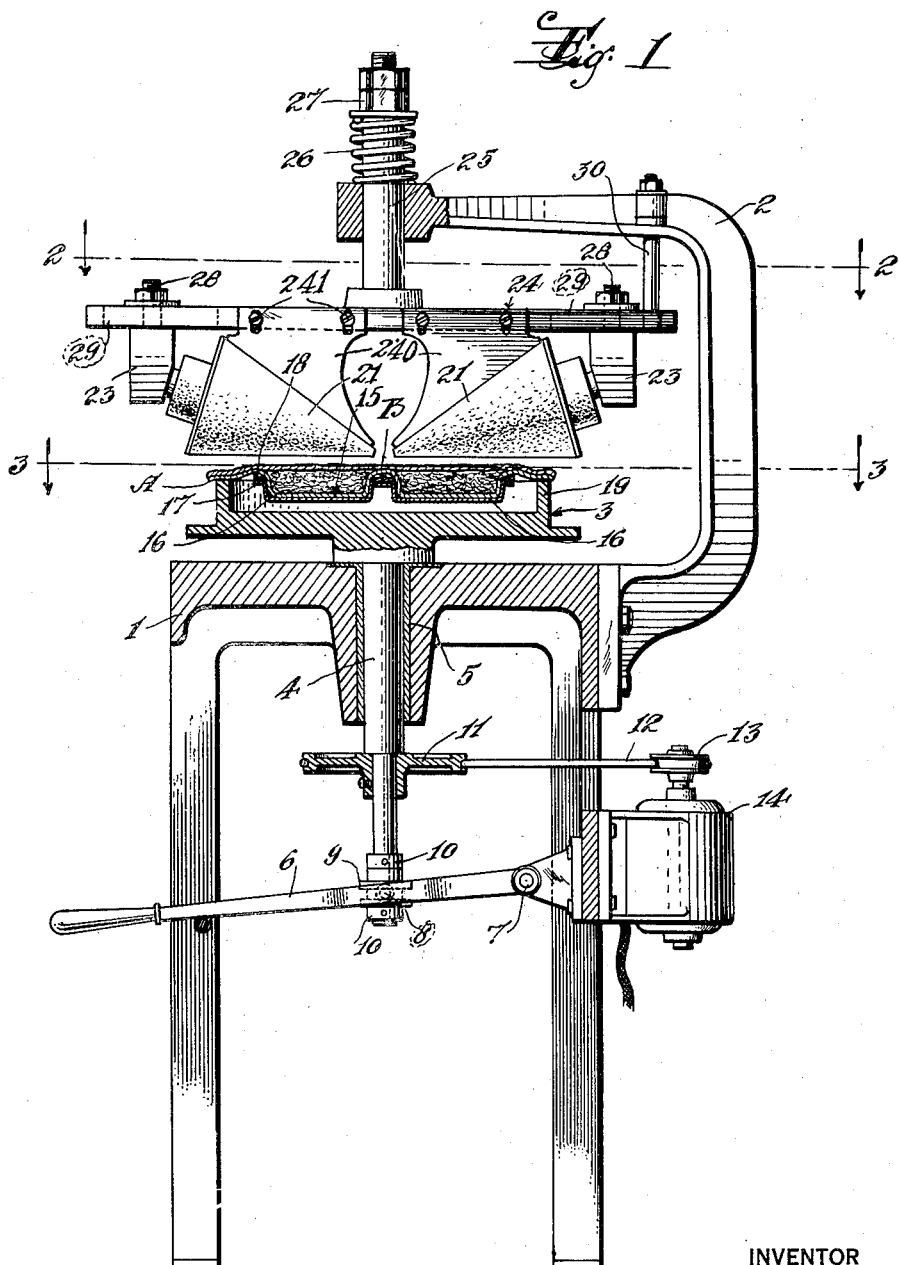

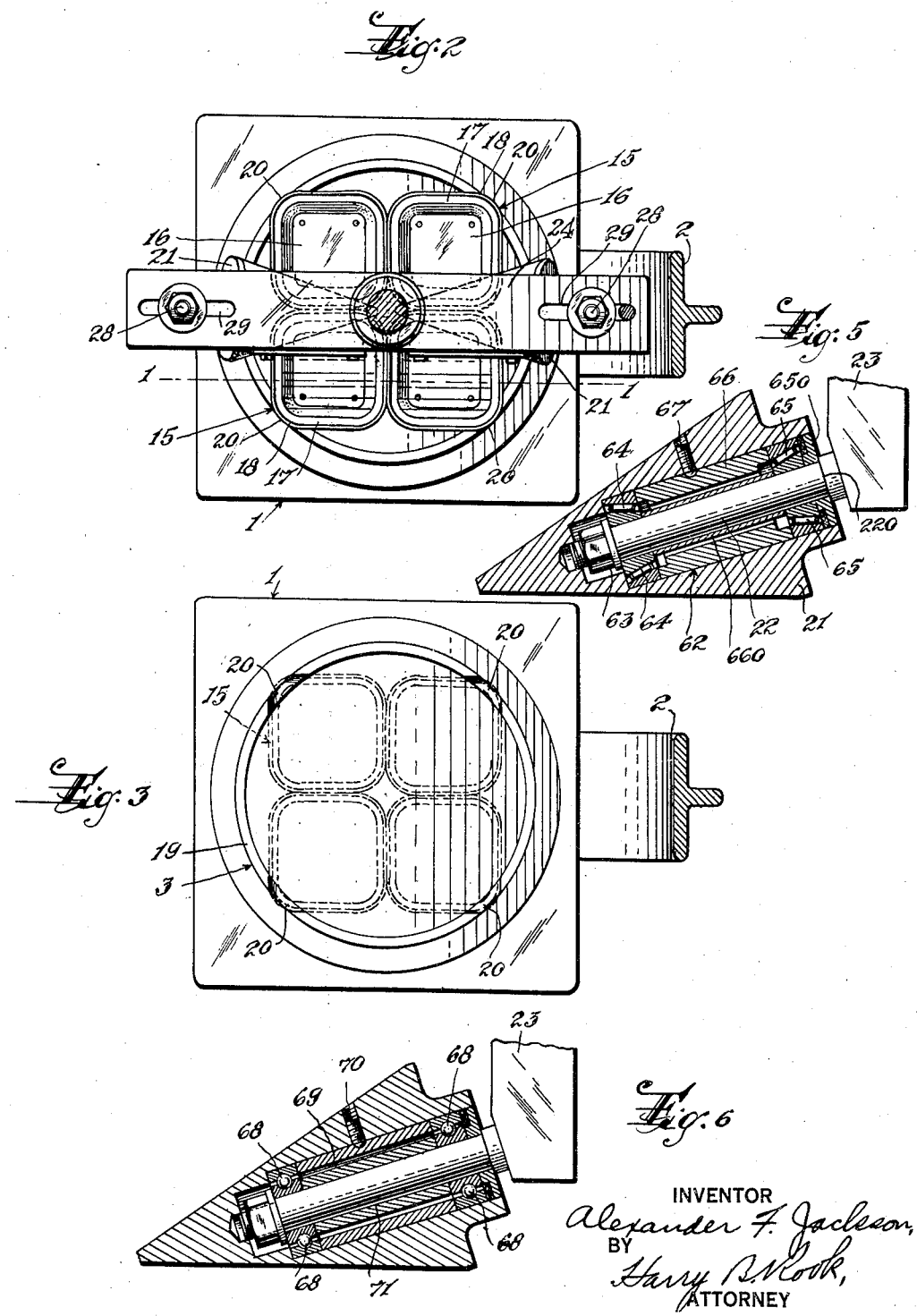

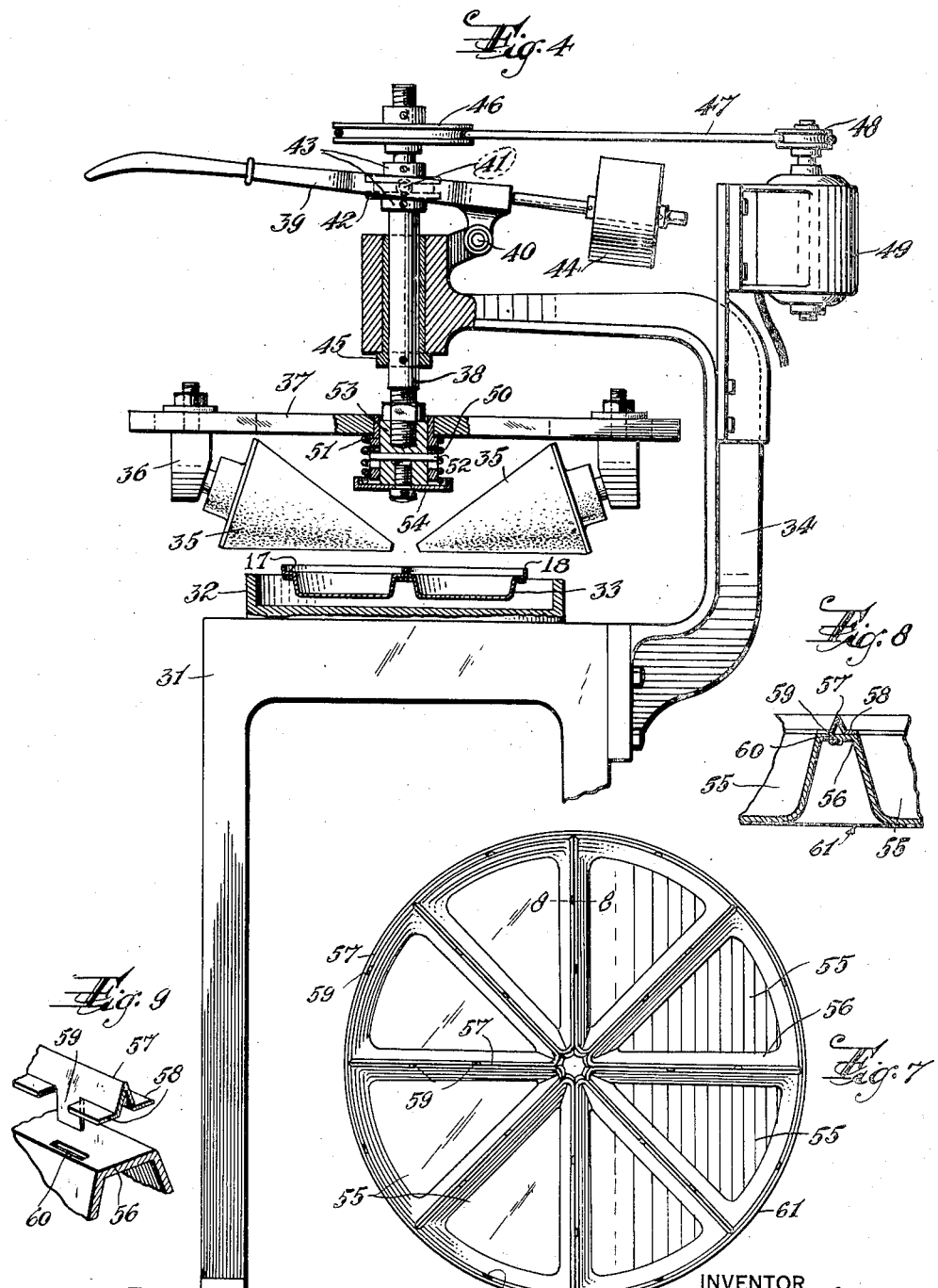

1,977,309

UNITED STATES PATENT OFFICE 1,977,309

PIE TRIMMER AND SEALER

Alexander F. Jackson, West Orange, N. J., assignor to Pie Bakeries, Inc., Newark, N. J., a corporation of Delaware Application May 12, 1933, Serial No. 670,647

7 Claims. (Cl. 107—1)

This invention relates in general to pie making machines, and more particularly to improvements in apparatus for trimming the upper and lower crusts of pies and sealing the crusts together at their edges to prevent escape of juices therebetween during baking. The invention is especially intended for use in trimming the crusts on pies which are made in group pans that are divided into or comprise a plurality of individual pie receiving recesses or receptacles, but the invention is also susceptible of use in trimming pies in the more common single circular or square tins.

Heretofore pies have been trimmed by rollers which have rotated around the edges of the pie tins to press or squeeze off the crust between the rollers and the edge of the pie tin; and other pie trimmers included holders for pie tins having ribs at the margins of the tins, and single straight rollers beneath which the pies have been moved with the rollers pressing the crusts between the rollers and the ribs on the holders to sever the crusts. Other pie trimming machines include reciprocating dies to cooperate with upstanding ridges on pie tins for severing the crusts by shearing between said dies and said ridges. In all of these known machines there has been always a tendency for the rollers or dies to cause sliding of the crusts so as to tear or wrinkle the crusts; the severing of the crusts has not been accomplished with the certainty and perfection desired; and the construction and operation of the machines are complicated. Furthermore, a complete change of rollers or dies has been required to accommodate pies of different shapes and sizes which has added difficulty and complication to the construction and operation of the machine.

A prime object of my invention is to provide a pie trimmer which shall overcome the above-mentioned disadvantages and objections incident to the known machines, which shall be capable of use, with slight adjustment, for trimming pies of widely different sizes and shapes, shall be simple and reliable in construction and operation, and shall seal or press together the edges of the upper and lower crusts simultaneously with trimming thereof.

Another important object is to provide such a pie trimming machine which shall embody a novel and improved construction wherein conical rollers have a rolling action in a circular path over the top of a pie which is arranged in a pie tin or a pie holder having upstanding flanges or ribs beneath the crusts at the edges of the pie so that the crusts are severed by pressing or squeezing thereof between said rollers and said flanges, whereby a pie can be trimmed quickly without danger of sliding, tearing or wrinkling of the crusts and the crusts can be sealed together simultaneously with the trimming.

Other objects are to provide a pie trimmer of this character wherein said conical rollers shall be mounted in axial planes common with the axis of said pie tin or pie holder with their smaller ends facing and adjacent the axis of the pie tin or pie holder and each with a portion of its periphery parallel with the plane of the top of said pie tin or pie holder, said conical rollers and said pie tin or pie holder being mounted for relative rotation about the axis of said pie tin or pie holder, whereby said rollers can have a rolling action upon the top crust of a pie in said pie tin or pie holder so as to sever the crust by pressure between said rollers and said flanges on the pie tin or holder; and to obtain other advantages and results as will be brought out by the following description.

In the accompanying drawings I have illustrated more or less schematically two forms of pie trimming apparatus embodying my invention, but it should be understood that these drawings are primarily for the purpose of illustrating the principles of the invention and that the invention may be embodied in other details of structure without departing from the spirit or scope of the invention.

Referring to the said drawings, in which corresponding and like parts are designated throughout the several views by the same reference characters, Figure 1 is a vertical longitudinal sectional view through a pie trimming apparatus embodying my invention portions being shown in side elevation.

Figure 2 is a horizontal sectional view on the line 2—2 of Figure 1.

Figure 3 is a similar view on the line 3—3 of Figure 1 with the pie pan shown in dot and dash lines for clearness in illustration.

Figure 4 is a view similar to Figure 1 showing a modified form of the invention.

Figure 5 is an enlarged vertical longitudinal sectional view through one of the conical rollers and its bearing.

Figure 6 is a similar view showing a modified form of bearing for the conical rollers.

Figure 7 is a top plan view of a modified form of pie holder or pie tin.

Figure 8 is a fragmentary transverse vertical sectional view on the line 8—8 of Figure 7, and Figure 9 is a composite fragmentary perspective view showing the details of the pie holder shown in Figure 7.

Specifically describing the embodiment of the invention illustrated in Figures 1 to 3 inclusive the pie trimming apparatus includes a supporting frame or table 1 having an upwardly projecting bracket 2 which overhangs the top of the table 1. A pie plate holder 3 is journaled in the top of the table 1 to rotate about a vertical axis, the pie plate holder being shown as formed with a coaxial shaft 4 journaled in a bearing 5 in the table top and extending downwardly beneath the latter. The pie plate holder 3 is also vertically reciprocable by longitudinal sliding of the shaft 4 and for reciprocating the shaft 4 I have shown a lever 6 pivoted at one end at 7 on the supporting frame and having lateral pins 8 engaging a grooved collar 9 rotatably mounted on the shaft 4 between thrust bearings 10. By oscillating the lever in vertical planes, the pie plate holder may be moved up and down, the pins 8 and collar 9 permitting rotation of the pie plate holder simultaneously with its reciprocation.

For rotating the pie plate holder I have shown a pulley 11 on the shaft 4 which is connected by a belt 12 to a smaller pulley 13 on the shaft of an electric motor 14 which is mounted on the frame 1. The motor may be controlled by any suitable switching mechanism.

The pie plate holder 3 is shown as constructed to receive and hold a pie tin 15 which comprises a plurality of separate pans or receptacles 16 connected together into a unitary structure. As shown, each pan 16 is approximately square in plan view, and four pans are connected together to form an approximately square unit. Each pan has a horizontal or lateral marginal flange 17 and an upstanding or vertical perimetral flange 18 which projects from the flange 17 and is preferably of a height substantially less than the combined thickness of two pie crusts. The pie plate holder 3 has an annular flange 19 to receive and support the baking pan 15, said flange 19 being notched at 20 to receive the corners of the baking pan. Obviously the shape of the pie plate holder may be modified or changed as desired.

As a pie is assembled in the baking pan 15 the lower crust A is formed of a single sheet of dough which overlies all of the pans 16 and the flanges 18, and the top crust B is similar in form and overlies the tops of all of the pies in the pans 16 and overhangs the flanges 18 above the edges of the bottom crust, all as clearly shown in Figure 1.

In accordance with the invention, the two crusts A and B are severed by squeezing them between pressers, such as rollers, and the edges of the upstanding flanges 18; and the edge portions of the two crusts are simultaneously pressed together so as to seal the pies. For so severing the crusts and trimming the pies I have shown a pair of conical rollers 21 which have their axes in a common plane with the axis of the pie plate holder 3 and portions of their peripheries in a plane parallel with the plane of the pie plate holder and the top edges of the flanges 18. These rollers are journaled on bearing studs 22 which project from arms 23 that are in turn mounted on a yoke 24, the smaller ends of the rollers being disposed adjacent the axis of the pie plate holder. Each roller is of a length to extend from the perimeter of the pie receptacle or pie holder to a point adjacent the axis of the latter. The yoke 24 is mounted on a shaft 25 in the bracket 2, the shaft 25 preferably being coaxial with the pie plate holder and being reciprocable in the bearing bracket toward and from the pie plate holder. A portion of the weight of the rollers 21 and yoke 24 is assumed by a compression spring 26 interposed between the bracket arm 2 and adjusting nuts 27 on the shaft 25. The arms 23 are adjustable longitudinally of the yoke 24 toward and from each other, by bolts 28 integral with the arms and passing through slots 29 in the yoke.

Normally, the pie plate holder 3 rests upon the top of the frame 1 and the rollers 21 are spaced above the pie plate holder. When a pie is to be trimmed, it is placed in the pie pan 15 which is then set in the pie plate holder 3 as clearly shown in Figure 1. Thereupon the motor 14 is started so as to rotate the pie plate holder, and the lever 6 is then raised to move the top surface of the pie into contact with the conical rollers 21. This causes a rolling action of the conical rollers upon the pie crust under pressure exerted by the lever 6, and this in turn results in the crust being squeezed between the rollers and flanges 18 so that the crusts are severed and trimmed along the flanges. The single crusts A and B are thereby divided into a plurality of separate crusts, one for each pie in the pie pan. At the same time, the edge portions of the crusts are pressed together between the horizontal flanges 17 of the pie pans and the rollers so that the pies are sealed to prevent escape of liquids therefrom.

As shown, the yoke 24 is stationary, and the pie is moved under the rollers 21. For holding the yoke against rotation, a pin 30 projects from the bracket arm 2 into one of the slots 29.

It will be observed that the rolling action of the conical rollers and their relation to the pie are such that tendency of the crusts to slide transversely of the pie pans under influence of the rollers is eliminated and tearing or wrinkling of the crusts is practically impossible so long as the rollers are clean. Any suitable means such as scraper blades commonly used in this art, may be provided for removing particles of dough or foreign matter from the conical rollers. As shown, scraper blades 240 may be adjustably mounted on the yoke 24 by screws and slots 241 to frictionally contact with the peripheral surfaces of the rollers. The machine makes it possible to divide a single crust into a plurality of separate crusts in one simple operation, and also serves to simultaneously trim and seal a plurality of pies.

The rollers can be adjusted toward and from the pie plate holder by adjustment of the nuts 27, and this adjustment in connection with the spring 26 provides for a yielding contact of the rollers with the pie crusts and for different degrees of pressure of contact.

A modification of the invention is shown in Figure 4 wherein the machine includes a main frame 31, having a pie plate holder 32 immovably mounted on the top thereof to receive and support a pie pan 33 which may be identical with the pie pan 15 hereinbefore described. A bracket arm 34 extends upwardly from the frame 31 and overhangs the top of the frame.

A pair of conical rollers 35 which may be identical with the rollers 21 are mounted for rotation about their axes and for orbital movement about the axis of the pie plate holder 32. As shown, these rollers are mounted by bearing arms 36, like the arms 23, on a yoke 37 which is supported by a reciprocable shaft 38 that is journaled for rotation and reciprocation in the bracket arm 34 coaxially with the pie plate holder 32.

For reciprocating the shaft 38 I have shown a lever 39 pivoted intermediate its ends at 40 on the bracket arm 34 and having pins 41 arranged in a groove 42 which is rotatable on the shaft 38 between bearings 43. By oscillation of the lever 39, the shaft 38 and yoke 37 may be moved up and down. For holding the shaft and yoke in their uppermost position I may utilize a counterweight 44 on the end of the lever 39 and limit upper movement of the shaft by a shouldered bearing sleeve 45 secured to the shaft to abut the arm 34.

For rotating the shaft 38 I have shown a pulley 46 which is connected by a belt 47 to a pulley 48 on the shaft of an electric motor 49 which is mounted on the bracket arm 34.

With this construction, it will be observed that the yoke 37 and rollers 35 may be moved at will toward the pie plate holder by the lever 39 and that the rollers may have an orbital movement by rotation of the yoke under influence of the motor 49. The crusts of a pie are severed and trimmed in the same manner as described in connection with Figure 1, the rollers having a rolling contact with the crusts and squeezing the crusts between the rollers and the flanges 18. The main difference between this form of the invention and that shown in Figure 1, is that in Figure 1 the pie is rotated under the rollers while in Figure 4 the rollers are rotated over the pie.

To provide for a yielding contact of the rollers with the pie, the yoke 37 is supported on the shaft 36 by a compression spring 50. As shown, the yoke has a depending bushing 51 which has a pin and slot connection 52 with an extension 53 of the shaft 38 upon which is mounted a bearing plate 54 between which and the yoke is interposed the spring 50. The spring 50 normally assumes a portion of the weight of the yoke and the rollers so that varying degrees of pressure of contact between the rollers and the pie crusts may be obtained.

Obviously the detailed structure of the pie holder or pie pan may be modified without departing from the spirit or scope of the invention. For example, the pie pan may be in the form shown in Figures 7 to 9 inclusive where a circular pan is shown as formed of one piece of material stamped to provide a plurality of sector shaped pie receptacles or recesses 55 which are spaced by partition walls 56. The pie pan has an annular perimetral flange 61 common to all of the pie receptacles 55. Upon the dividing partitions 56 and the perimetral flange 61 of the pan are mounted upstanding ribs 57. These ribs are shown as formed of sheet material stamped to provide inverted V-shaped ribs 57 and lateral edge flanges 58. The edge flanges 58 have ears 59 struck up therefrom which are clinched through openings 60 in the dividing partitions 56 and perimetral flange of the pan. The upstanding ribs 57 perform exactly the same function as do the upstanding flanges 18 shown in Figure 1.

It is desirable that the rollers 21 freely rotate and be accurately journaled against wobbling about their axes, and accordingly I contemplate using long bearing spindles 22 and ball or roller bearings. As shown in Figure 5, each roller has a coaxial recess 62 in which the bearing spindle 22 is located. The free end of the bearing spindle has a nut 63 and a roller bearing 64. At the outer end of the spindle is arranged another roller bearing 65, and interposed between the roller bearings is a sleeve 66 which is rigidly connected to the roller by a set screw 67. The roller bearings 64 and 65 nicely fit the recess 62 and are spaced apart a considerable distance on the spindle and the sleeves 66 and set screw 67 securely hold the roller on the spindle and roller bearings, and also space the outer sections of the bearings. A spacer sleeve 660 is also provided for holding the inner sections of the roller bearings in spaced relation. A thrust plate 650 is interposed between the roller bearing 65 and a shoulder 220 on the spindle 22. The thrust plate 650, roller bearings, sleeves 66 and 660 and the nut are all assembled on the spindle 220 and clamped in position by the nut 63, after which the roller 21 is fitted over the roller bearings and sleeve 66.

A modification of the mounting for the roller is shown in Figure 6 where ball bearings 68 are utilized instead of roller bearings, the roller being assembled on the spindle and ball bearings with a sleeve 69 corresponding to the sleeve 66, a set screw 70 corresponding to the set screw 67, and a spacer sleeve 71 like the sleeve 660.

From the foregoing it will be observed that the apparatus is adapted for use, with slight adjustment of the rollers 21 or 35, for trimming and sealing pies of widely differing sizes and shapes; the apparatus is simple and inexpensive in construction and operation and crusts can be quickly trimmed with accuracy and certainty and without danger of tearing or wrinkling of the crusts.

In the accompanying claims, the word "pie holder" is intended to include either a combination of a pie pan and a pie plate holder, or a pie pan alone, or any other device for holding a pie during trimming operation.

Having thus described my invention, what I claim is:

1. A pie trimmer comprising a pie holder having a pie receptacle and marginal upstanding flanges the top edges of which are in a common plane and over which a crust is laid as it is applied to a pie in said holder, a plurality of conical rollers above said pie holder having their axes in a common plane with the axis of said pie holder and portions of their peripheries in a plane parallel with the plane of the top edges of said flanges, each roller being of a length to extend from the perimeter of the pie receptacle to a point adjacent the axis of the latter and the smaller ends of said rollers being disposed adjacent the axis of said pie holder, means for causing relative movement of said pie holder and said rollers toward each other to compress a pie crust between said rollers and said flanges, and means for causing relative rotation of said pie holder and said rollers about the axis of said pie holder to produce a rolling action of said rollers on said crust to sever the crust at said flanges.

2. A pie trimmer comprising a pie holder having a pie receptacle and marginal upstanding flanges therefor the top edges of which are in a common plane and over which a crust is laid as it is applied to a pie in said holder, a plurality of conical rollers mounted for rotation about their axes and for orbital movement about the axis of said pie holder in a plane above the latter, each roller being of a length to extend from the perimeter of the pie receptacle to a point adjacent the axis of the latter and the smaller ends of said rollers being adjacent the axis of orbital movement and the axes of rotation of said rollers being in a common plane with said axis of orbital movement with portions of the peripheries of said rollers disposed in a plane parallel to the plane of said top edges of said flanges, means for imparting orbital movement to said rollers, and means for causing relative movement of said rollers and said pie holder toward each other to compress a pie crust between said rollers and said flanges and sever the crust.

3. A pie trimmer comprising a frame, a pie holder rotatable about a vertical axis thereon and axially reciprocable, said holder having a pie receptacle and marginal upstanding flange therefor the top edges of which are in a common plane and over which a crust is laid as it is applied to a pie in said holder, a trimmer head including a yoke mounted on said frame above said pie holder, a plurality of conical rollers journaled on said yoke with their axes in a common plane with the axis of said pie holder and portions of their peripheries in a plane parallel with the plane of the top edges of said flanges, each roller being of a length to extend from the perimeter of the pie holder to a point adjacent the axis of the latter and the smaller ends of said rollers being disposed adjacent said axis of the pie holder, means for reciprocating said pie holder to compress a crust on a pie between said rollers and said flanges, and means for rotating said pie holder while said crust is in contact with said rollers.

4. The pie trimmer set forth in claim 3 wherein said yoke is yieldably mounted to permit said rollers to yield under pressure from said pie holder, and with the addition of spring means for counterbalancing a portion of the weight of said rollers and said yoke.

5. A pie trimmer comprising a frame, a pie holder on said frame having a pie receptacle and marginal upstanding flanges therefor the top edges of which are in a common plane and over which a crust is laid as it is applied to a pie in said holder, a trimmer head including a yoke reciprocably mounted in said frame above said pie holder to move toward and from the latter and rotatable coaxially with said pie holder, a plurality of conical rollers journaled on said yoke with their axes in a common plane with the axis of said pie holder and portions of their peripheries in a plane parallel with the plane of the top edges of said flanges, each roller being of a length to extend from the perimeter of the pie holder to a point adjacent the axis of the latter and the smaller ends of said rollers being disposed adjacent said axis of the pie holder, means for reciprocating said yoke to compress a crust between said rollers and said flanges, and means for rotating said yoke to cause rolling action of said rollers over said crust.

6. The pie trimmer set forth in claim 5 wherein said yoke is mounted to yield when pressed against said pie holder, and with the addition of spring means for partially counterbalancing the weight of said rollers and said yoke.

7. A pie trimmer comprising a pie plate holder, a plurality of conical rollers above said pie plate holder having their axes in a common plane with the axis of said pie holder and portions of their peripheries in a plane parallel with the plane of said pie plate holder, each roller being of a length to extend from the perimeter of the pie holder to a point adjacent the axis of the latter and the smaller ends of said rollers being disposed adjacent the axis of said pie holder, means for causing relative movement of said pie holder and said rollers toward each other, and means for causing a relative rotation of said rollers and said pie plate holder about the axis of the latter.

ALEXANDER F. JACKSON.